Jan. 10, 1956 — K. R. McCONNELL — 2,730,567

FACSIMILE SCANNING METHOD AND APPARATUS FOR PREDETERMINED SIGNAL OUTPUT AND CONTRAST

Filed June 15, 1950 — 2 Sheets-Sheet 1

INVENTOR.
K. R. McCONNELL
BY E. R. Evans
Atty

INVENTOR.
K. R. Mc CONNELL
BY E. R. Evans
Atty

United States Patent Office 2,730,567

Patented Jan. 10, 1956

2,730,567

FACSIMILE SCANNING METHOD AND APPARATUS FOR PREDETERMINED SIGNAL OUTPUT AND CONTRAST

Kenneth R. McConnell, Red Bank, N. J., assignor to Times Facsimile Corporation, New York, N. Y., a corporation of New York Application June 15, 1950, Serial No. 168,295

11 Claims. (Cl. 178—7.1)

This invention relates to facsimile transmitting or scanning systems and apparatus, and more particularly to an electro-optical system of this character having only a single adjustable control for handling various types of copy and obtaining output signals having desired characteristics.

The ordinary facsimile scanning means comprises a photocell modulator for converting tone variations of elemental areas of copy to be transmitted into electrical signals of corresponding or varying amplitudes. In the usual copy or message sheets to be transmitted or reproduced, a considerable variation in photocell pickup or excitation is found between the white or lightest background of different copies or sheets and also between the black or darkest tones. Since the characteristics of the transmitting circuits or radio channel equipment, as well as of the facsimile reproducing equipment, permit undistorted recording of signals in only the normal range of perhaps 10 to 15 db difference in voltage, it is necessary to limit the maximum or black signal level transmitted. In order to minimize the effects of noise or other disturbances, it is also essential to keep the white or minimum signal level above a predetermined minimum value. In other words, both the minimum and maximum signal levels must be controlled under normal conditions. Furthermore, unless special equipment is employed in recording, the reproducing process requires a fixed contrast or amplitude ratio between minimum and maximum signals, for example of the order of 12 to 15 db, for satisfactory recording.

In order to control the levels of the minimum and maximum signals to meet these transmission and recording requirements, it has been customary to provide individual transmitter controls for adjusting the levels of the maximum black signal and the minimum white signal to correct for the variations in the contrast between the black and white areas of the different copies or picture subjects. Since the modulator adjustment or other arrangement for adjusting the minimum signal level of the transmitter also affected the maximum signal level, it was necessary to have at least two independent controls for obtaining the desired contrast and signal levels at the transmitter or scanner. The two or more adjustments being interrelated, it has often been necessary to re-adjust each control several times before making a transmission in the case of a copy having a different contrast between black and white portions than the preceding copy.

In accordance with a feature of the present invention, a scanning means is provided which is designed to give an output signal having a fixed maximum level and a predetermined amplitude ratio or contrast between black and white signals by means of a single adjustable control which is set with the scanner on "white" or the lightest background of the copy. For simplicity, the upper and lower signal levels are called "black" and "white" herein, but signal inversion may of course be employed at either the transmitter or recorder, as is well known in the art.

The object of the invention, therefore, in general terms, is to simplify the operation of facsimile transmitting or scanning means and substantially eliminate the technical skill heretofore required to obtain satisfactory reproduction in facsimile systems generally. In addition, the system embodying the invention and utilizing a single adjustable control has the advantage that improved results are obtained where the operator is not especially competent or skillful or is not careful in setting the adjustments for optimum transmission, as shown by actual experience in both short and long-distance facsimile operations over a considerable period.

Other objects and advantages of the invention will appear from the following description of the preferred embodiments shown in the drawings, wherein.

Figure 1:
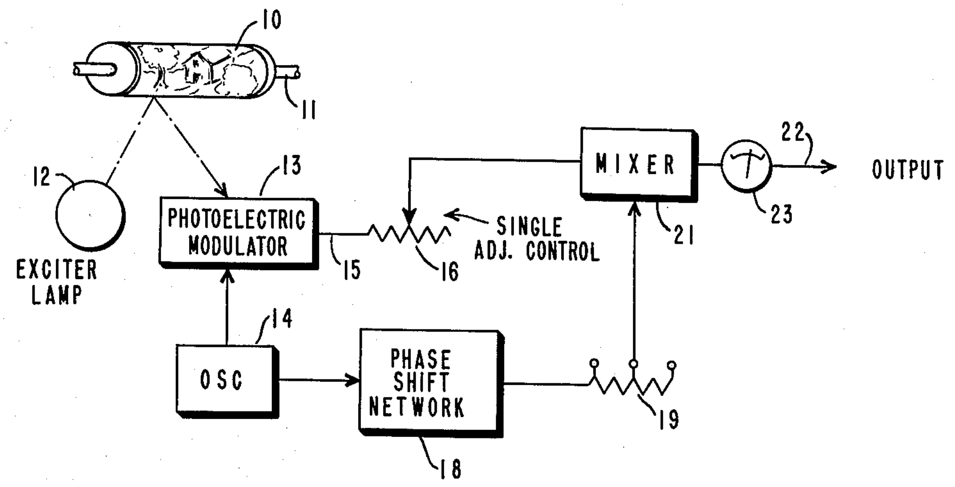
Fig. 1 is a block diagram of a facsimile system embodying the invention.
Figure 2:
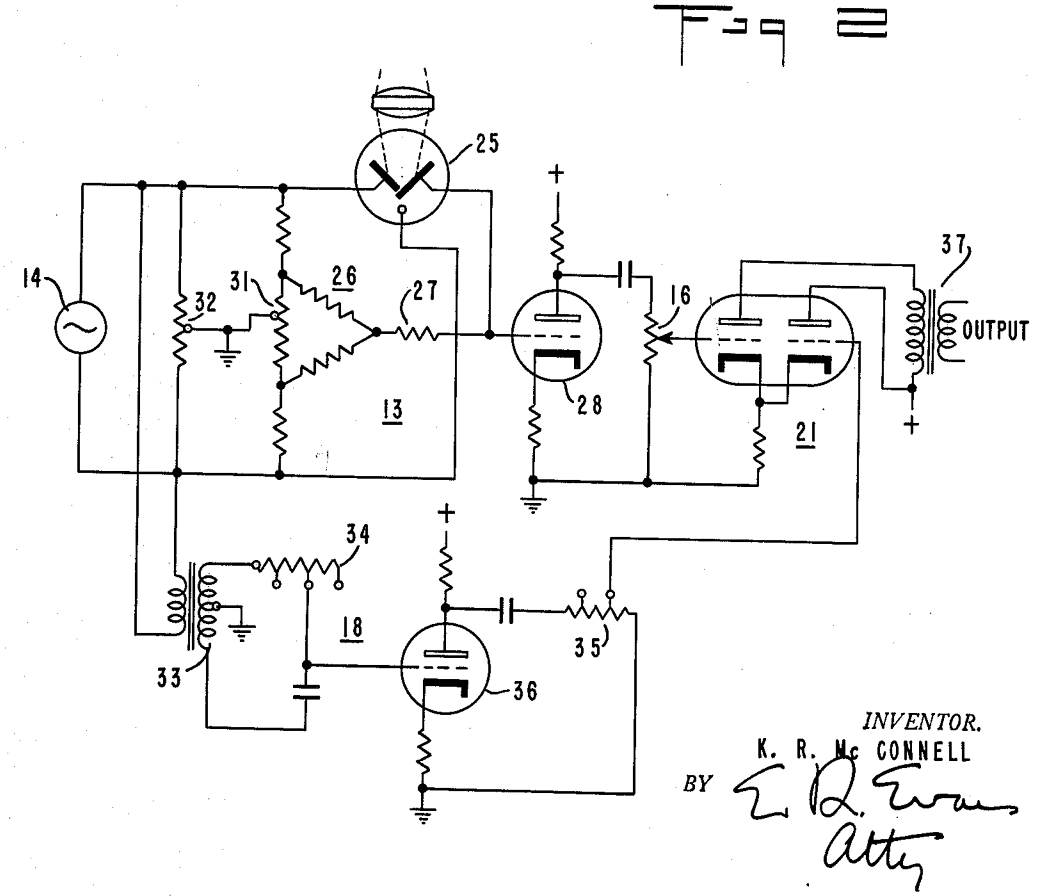
Fig. 2 is a schematic circuit diagram of the system shown in Fig. 1.

Referring to Figs. 1 and 2, the facsimile transmitting or scanning system shown comprises a rotating drum or cylinder 10 on which the copy to be transmitted is mounted. The drum 10 is rotated by the lead screw 11 as in the conventional facsimile scanner and the copy is illuminated by the exciter lamp 12 forming part of the usual optical system. The light reflected from the copy is employed to generate a train of electrical signals or waves varying in accordance with the variations in shading of the elemental areas of the copy, as for example by a photoelectric modulator 13 including a photoelectric cell. In a preferred arrangement an oscillator or carrier generator 14 is connected to the modulator 13 so that a modulated carrier current is produced in the output circuit 15 of the modulator having a frequency corresponding to the carrier frequency and an amplitude depending upon the instantaneous illumination of the photoelectric cell by the light reflected by the copy. The modulating means shown in Figs. 1 and 2 by way of example is generally similar to that disclosed and claimed in the prior patent of W. P. Asten, No. 2,430,095, dated November 4, 1947, employing a double-cathode photoelectric cell as disclosed in the prior patent of J. R. Shonnard, No. 2,459,293, dated January 18, 1949. However it will be apparent that other forms of signal modulators may be employed in connection with the invention to generate a signal varying in amplitude in accordance with the variations in the shading of the copy to be transmitted.

In actual practice message copy or pictures to be transmitted or reproduced by facsimile apparatus vary to a considerable extent in the color or whiteness of the so-called white background, in the shading of the lightest areas of the picture and in the density of the black lines or blackest tones of the copy. It is not feasible, therefore, to have a fixed scanning range or adjustment in a facsimile system to obtain satisfactory reproduction of both light and dark picture areas or satisfactory black and white recording in the case of message copy. On the other hand the limitations of the transmitting channel, whether wire or radio, impose a condition which has to be satisfied for efficient transmission, namely, that the variation of amplitude of the signals be maintained between predetermined limits, since the minimum signal level should be considerably above the noise level and the maximum amplitude level should not exceed the capacity of the circuit or channel. It is necessary from a practical standpoint, therefore, to limit the difference between maximum and minimum signals to a predetermined range between 6 and 15 db depending upon the particular channel or equipment available, and in any particular instance a substantially constant amplitude ratio between maximum or black signals and minimum or white signals is required. Even in the case where the facsimile recorder is in the proximity of the transmitting scanner and no transmitting line or channel is required, as in duplicating or copy work, the operating characteristics of the reproducer or recorder require that a substantially constant amplitude ratio between minimum and maximum signals be maintained for optimum results.

Since both the black and the white tones vary in different copies, it has been considered necessary in previous equipment to adjust the modulator for a predetermined minimum signal level and adjust the amplification to obtain the desired maximum level on black; however, since these controls are interrelated or interdependent in the ordinary modulator system, it was necessary to readjust the balance and the amplification control separately and usually repeatedly where the copy to be transmitted differed from the copy previously sent.

With this system it was possible to unbalance the bridge modulator for the predetermined minimum white signal and set the proper maximum level on black, where a partial reversal in the picture tones would exist. This occurred when the minimum control was adjusted in the wrong direction from the null point.

Accordingly this procedure not only required considerable skill but in practice has often caused inferior reproduction because of the maladjustment of the transmitting equipment by careless or inadequately trained operators. In accordance with the invention this difficulty is overcome by generating a signal of fixed level representing the maximum or black signal and balancing out this signal to the desired extent in accordance with the tone shading of the copy being scanned so that a single control for the white or minimum signal is effective to insure a substantially constant contrast or amplitude ratio between the minimum or white signal and the maximum or black signal and also provide a white or minimum signal of predetermined amplitude. In this manner the conditions imposed by the limitations of the transmitting facilities and the recording or reproducing apparatus are met in a scanner having only a single control requiring little or no skill to adjust properly.

As shown in Fig. 1, the single manually-operable control comprises a potentiometer or rheostat 16 in the output circuit 15. In this embodiment of the invention, a second signal is derived from the oscillator 14 and preset as to phase and amplitude by the phase-shift network 18 and variable resistor 19. The second signal of constant amplitude is then combined with the modulated signal in a mixer 21. Initially the element 19 is set to provide an output signal in the output circuit 22 of the scanner which has a predetermined maximum or black level when the photocell or modulator 13 is not illuminated (scanning black). Then during actual operation the photoelectric modulator is set to scan the whitest or lightest portion of the copy on the drum 10 and the potentiometer 16 is adjusted until the signal in the output circuit 22 is a minimum as indicated by the meter 23. No further adjustments are required since the maximum or black signal is determined by the fixed adjustment of resistor 19, and the minimum level is determined by the fixed phase shift of network 18. Therefore, both the level of the minimum or white signal and the contrast or amplitude ratio between white and black signals may be readily adjusted to the predetermined values by merely adjusting the control 16 until a minimum reading is obtained in the meter 23 when the photoelectric modulator 13 is scanning the lightest portion of the copy.

The detailed circuits of suitable forms of the photocell modulator, phase-shift network and mixer are shown in Fig. 2. Referring to this figure, the photoelectric modulator system 13 comprises a double cathode photoelectric cell 25 connected to a balancing bridge 26 of well known type as described in the above-mentioned Asten patent, in series with the grid resistor 27 and associated amplifier 28. The modulator bridge network 26 is balanced on black by setting the variable resistor 31 thereof and also the parallel or shunt resistor 32 substantially as described in the said patent. However, instead of employing a manually adjustable potentiometer in the bridge network, the variable resistors 31 and 32 are adjusted for the photocell 25 and output system employed in any particular scanner and no further adjustments are required in the bridge network during operation. For detailed explanation of the theory and operation of the modulator 13, reference is made to the above-mentioned patents. The phase-shift network 18 of a conventional type connected through transformer 33 to the carrier generator or oscillator 14 employs a variable resistor 34 which is set initially for proper phase displacement and output voltage potentiometer 35 is initially set for the desired black signal output level. Controls 34 and 35 are not disturbed or readjusted during operation of the equipment. The proper adjustment of the resistor 34 depends upon the signal contrast desired in transmission. As shown an amplifier 36 may be employed if desired in the auxiliary circuit for supplying reference signal to the mixer 21.

The mixer 21, as shown, is a dual triode connected as a cathode follower with the two input signals injected into the grids and the cathodes connected together. However, any conventional mixer may be employed for subtracting the modulated signal from the amplifier 28 from the reference or black signal level of predetermined phase in the output of the amplifier 36. In this manner the difference between the modulated and fixed reference signals appears in the transformer 37 having its primary connected to the respective plate electrodes of the mixer tube 21. Other suitable types of modulators and signal controlling and mixing arrangements may be substituted for the modulator 13, phase-shift network 18, mixer 21 and controlling and regulating means illustrated in the drawings.

Figure 3:
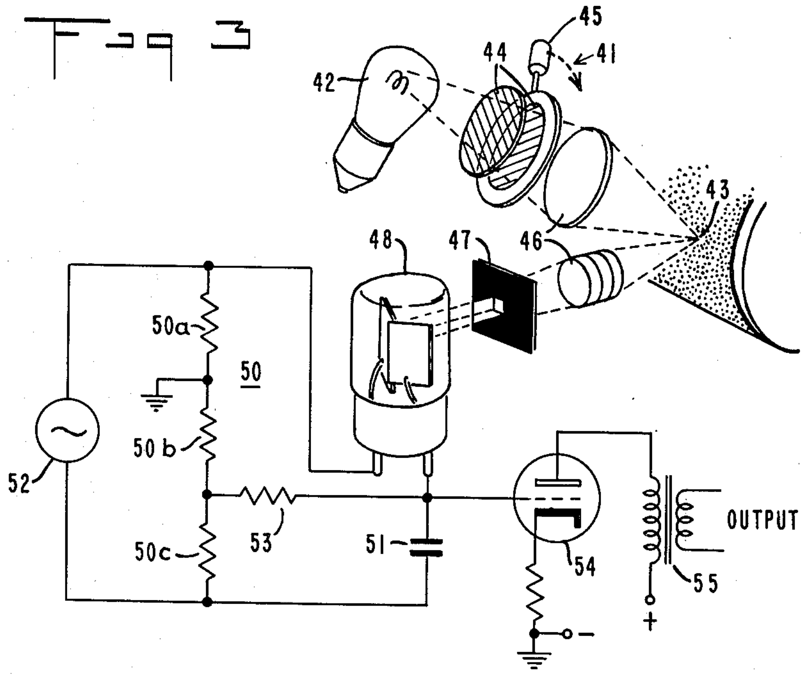
Figs. 3 and 4 are diagrammatic views of preferred modifications of the invention in which the adjustment is effected by regulating the light on the photocell.
Figure 4:
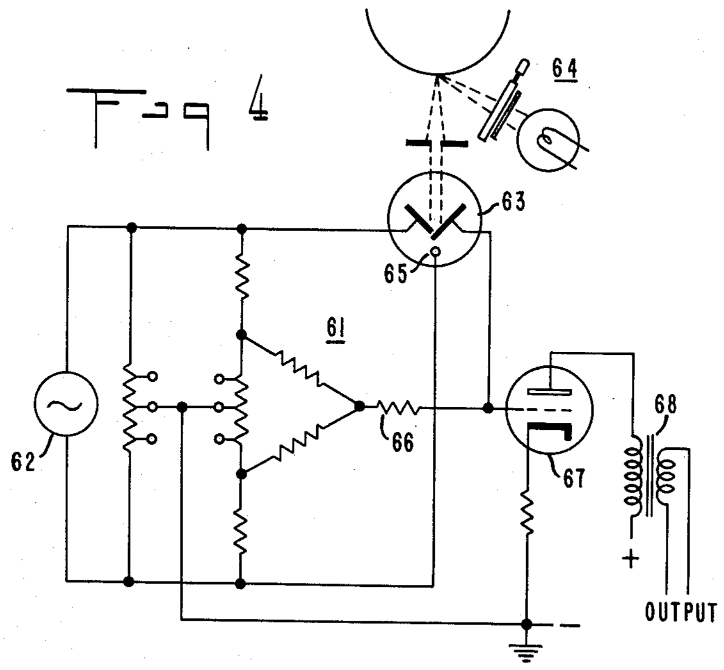

Instead of controlling the level of the signal from the photocell portion of the circuit by means of the gain control 16 associated with the modulator, the control may be effected by variation of the illumination of the photoelectric cell to produce the same signal level in the output of the modulator for different colors or shading of the lightest area of the copy or picture being transmitted. This preferred modification is shown in Figs. 3 and 4, which illustrate the use of a light regulating valve or shutter 41 interposed between the exciter lamp 42 and the elemental area 43 of the copy being scanned on the drum. As shown by way of example, the light regulating shutter or valve 41 comprises two discs 44 in the form of polarizing screens so that the light passing through the two screens can be regulated as well known by adjusting the optical axis of one screen with respect to the other by the knob 45. Any suitable manually-operable regulating arrangement of this type for controlling the illumination of the photoelectric cell may be employed.

The optical system may be of any suitable type and as shown comprises the usual condenser and objective lenses 46 arranged to focus the image of the copy mounted on the drum onto an aperture in a shield 47. Light from an elemental area 43 of the copy passes through the aperture and impinges upon a photocell 48 corresponding to the photocell 25 in Fig. 2. The photocell 48, as in the first modification described above, is a part of or is connected to a network, whereby an output signal or E. M. F. is generated which varies in amplitude with the variations in light reflected from the elemental areas of the copy upon the scanning means. Any suitable type of bridge or network may be employed in connection with the scanning means, such as the well known type having a carrier or signal source which is keyed by the photocell to produce a modulated output signal. However the modulator system shown includes the photocell modulator 48 as a part of the balancing network 50, comprising resistors 50a, 50b and 50c, and a balancing capacitor 51 to partially balance the photocell capacity across a source 52 of carrier current.

The operation of this modulator is generally similar to that shown in Fig. 2 and in the above-mentioned Shonnard patient, except as specifically set forth below. The variations in the impedance or resistance of the photocell 48 cause corresponding changes in the potential drop in the grid resistor 53, thereby generating a modulated output carrier in the anode circuit of the amplifier 54 which includes the output transformer 55. A second carrier signal or E. M. F. of opposite phase is derived from the resistor 50b, also connected in the grid circuit of the amplifier 54. The initial adjustment of the modulator network by selection of the resistors 50a and 50c (of equal values) and 50b fixes the maximum or black signal level, this adjustment or selection being made under the condition of no illumination of the cell. Thus the maximum signal output is independent of the photocell modulator and is constant for all transmissions. Capacitance 51 is selected for the proper net reactive current through 53 to set the desired white or minimum signal, thus giving fixed, predetermined contrast or amplitude ratio when the signal output is adjusted to minimum on white. During operation no adjustment of the transmitting scanner is necessary except for varying the illumination of the copy when scanning white, as by means of the adjustable shutter or valve 41, until the white signal has a minimum amplitude. Since the maximum or black signal level is fixed under all conditions, the desired amplitude or contrast ratio is assured by merely adjusting the level of the minimum or white signal.

The modulator signal impressed upon the control grid of the output amplifier 54 is developed by the current in the resistors 50b and 53 in said grid circuit. The potential drop or E. M. F. across resistor 53 consists of: (*a*) the component resulting from resistive current flow through the photocell 48; (*b*) the capacitive component resulting from interelectrode capacity in the photocell not balanced out by the capacitor 51. This E. M. F. is combined with: (*c*) the component resulting from the drop across the resistor 50b connected across the carrier source 52, the resistor 50b being grounded at its upper end and therefore effectively in series with the grid resistor 53 in the grid-cathode circuit of amplifier 54. Component *a* varies with the variations in shade or color of the copy being scanned and becomes zero or of negligible amplitude on black. Component *b* is not affected by the excitation of the photocell and is fixed by selecting capacitance 51, as already described. Component *c* is fixed by selecting resistor 50b and is likewise not affected by the excitation of the photocell, thus providing a constant maximum output signal level $(b+c)$ on black, when *a* is zero. Since component *c* is 180° out of phase with component *a*, the output level while scanning white and intermediate shades is determined by the difference between *a* and *c*. Furthermore the minimum level, when the illumination of the copy is adjusted by the shutter 41 until component *a* cancels component *c* on scanning white, is determined by the residual component *b* which is constant, thus insuring a constant contrast ratio (a predetermined minimum signal level on white and a predetermined maximum signal level on black).

In order to obtain this desired fixed maximum output level and fixed contrast, it is only necessary to adjust the level of illumination of photocell 48 when scanning white, until the output level is a minimum, by operating the shutter 41 or in some equivalent manner. (The phrase "when scanning white" refers to the lightest or whitest portion of the copy in each transmission). The improved scanning system described therefore provides predetermined optimum output level and contrast on different varieties of copy by simply adjusting the single adjustable control for minimum signal reading on the white or lightest portion of the copy.

As shown in Fig. 4, the modulator may include a resistance bridge 61 of the type disclosed in the above-mentioned Asten patent and designed to vary the output signal from the carrier source 62 in accordance with the illumination of the cell 63. The optical system 64 may be similar to that shown in Fig. 3. In this modulator the external capacitor 51 is replaced by the balancing electrode 65 in the photoelectric cell 63. The operation of the modulator is otherwise substantially the same as that shown in Figs. 2 or 3 and as described in detail in the above-mentioned Shonnard patent. The signal appearing across the grid resistor 66 is amplified in the amplifier 67 which is connected to the output transformer 68 in the conventional manner. As mentioned above, other types of modulating systems may be employed with the variable exciter lamp source in lieu of those shown in Figs. 3 and 4.

Figure 5:
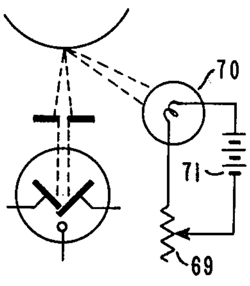
Fig. 5 is a detail view of a modified arrangement for varying the illumination of the photocell in the systems shown in Figs. 3 and 4.

Other equivalent ways of controlling the exciter lamp or copy illumination may also be employed if desired, for example a rheostat in series with the filament of the exciter lamp. This modification is illustrated in Fig. 5 wherein adjustment of a rheostat 69 in series with the exciter lamp 70 and a battery 71 is adapted to control the light output of the exciter lamp, which may replace the lamp and regulating shutter of Figs. 3 and 4.

From the foregoing description of several modifications, it will be apparent that the preferred embodiment of the invention relates to a method and system for obtaining fixed maximum level and constant contrast ratio in the output of a facsimile scanner or transmitter, from copies of varying background tones, by a single adjustment or adjustable control. The signal from the photocell modulator varies with the shading or density variations of the copy being scanned. This scanning signal is subject to the "single adjustable control" referred to above, and said control may be an arrangement for varying the exciter lamp illumination of the copy as shown in Figs. 3–5. A second signal of constant amplitude is combined with the scanning signal, said fixed second signal being of such amplitude and phase that it substantially balances out said scanning signal (or a desired large percentage of said signal) during scanning of "white" or the lightest portion of the background of the copy. Since the scanning signal is practically zero when scanning "black," on the other hand, said second signal (no longer balanced out by the scanning signal) constitutes the maximum "black" output signal. The scanner output signal thus varies between a controlled minimum signal and a fixed maximum level; therefore a fixed contrast ratio and fixed maximum level are obtained with a single adjustment.

Other modifications of the specific systems which have been shown and described in detail for the purpose of explaining the invention will occur to those skilled in the art and may be employed without departing from the scope of the invention as defined in the appended claims.

I claim:

1. In a facsimile scanning system for generating signals of different amplitudes representing different copy shadings with a predetermined maximum black-signal output and a predetermined amplitude ratio between black and white signals irrespective of the density of the lightest tone of the copy, incorporating a single adjustable control, in combination, means including a light source for illuminating the copy, means including a photocell used as a modulator for scanning successive elemental areas of the copy, an output circuit, a source of carrier current, means including said photocell and carrier current source to generate a first electromotive force in said output circuit varying in amplitude in accordance with the variations in light striking the photocell, means for deriving a second electromotive force from said carrier current, means whereby said second electromotive force is of constant amplitude and differs in phase from the first electromotive force, means for combining said second electromotive force with the first electromotive force in the output circuit so that said first electromotive force subtracts from said second electromotive force, and a single adjustable control means for varying the level of said first electromotive force to produce a combined minimum output signal of constant predetermined amplitude for any given white density of the copies being transmitted, allowing copies of varying white densities to be transmitted with the same signal contrast solely in response to the adjustment of said single control means.

2. A facsimile scanning system according to claim 1 in which said control means to produce a minimum output signal of predetermined amplitude consists of means to vary the illumination of the copy.

3. In a facsimile system for generating signals of different amplitudes representing different copy shadings with a predetermined maximum black-signal output and a substantially constant amplitude ratio between black and white signals irrespective of the density of the lightest tone of the copy, incorporating a single adjustable control, in combination, means including a light source for illuminating the copy, means including a photocell for scanning successive elemental areas of the copy, a source of carrier current, an output circuit, means connected to said source and including said photocell to produce a first signal in said output circuit varying in amplitude in accordance with the variations in light striking the photocell, means for deriving a second signal of different phase from said carrier current source which is independent of the excitation of the photocell and for combining the same with the first signal, said second signal being of substantially constant amplitude, and a single adjustable control means for varying the maximum value of said first signal when scanning white or the lightest background of the copy to produce a white output signal of desired magnitude without affecting the maximum black-signal level.

4. In a facsimile system for generating signals of different amplitudes representing different copy shadings with a predetermined maximum black-signal output and a substantially constant amplitude ratio between black and white signals irrespective of the density of the lightest tone of the copy, with the variable component of the system connected to a single adjustable control, in combination, means including a light source for illuminating the copy, means including a photocell for scanning successive elemental areas of the copy, a source of carrier current, an output circuit, means connected to said source and including said photocell to produce a first signal in said output circuit varying in amplitude in accordance with the variations in light striking the photocell, means for deriving a second signal of different phase from said carrier current source which is independent of the excitation of the photocell and for combining same with the first signal, said second signal being of substantially constant amplitude, and manually operable adjustable control means for varying the illumination of the copy by said light source to produce a white output signal of desired magnitude without affecting the maximum black-signal level.

5. In a facsimile system for generating signals of different amplitudes representing different copy shadings with a predetermined maximum black-signal output and a substantially constant amplitude ratio between black and white signals irrespective of the density of the lightest tone of the copy, incorporating a single adjustable control, in combination, means including a photocell modulator for scanning successive elemental areas of the copy, to produce a first signal varying in amplitude in accordance with the variations in light striking the photocell, means for generating a second constant signal having the same carrier frequency and a predetermined out-of-phase relation with respect to the first signal, means for combining said signals, said second signal being of substantially constant amplitude to produce an output signal of predetermined level when the first signal is zero or negligibly small, and a single adjustable control means for varying the value of said first signal when scanning white or the lightest background of the copy to produce a white output signal of desired magnitude and thereby obtain the same signal contrast with copies of varying white densities solely in response to the adjustment of said single control means.

6. In a facsimile system for generating signals of different amplitudes representing different copy shadings with a predetermined maximum black-signal output and a substantially constant amplitude ratio between black and white signals irrespective of the density of the lightest tone of the copy, with the variable element of the system connected to a single adjustable control, in combination, means including a photocell for scanning successive elemental areas of the copy, and producing a first signal consisting of a carrier wave varying in amplitude in accordance with the variations of light striking the photocell, means for generating a second signal and combining the same with said first signal, said second signal having the same carrier frequency and a predetermined out-of-phase relation to the first signal and being of substantially constant amplitude, and a single adjustable control means for fixing the value of said first signal when scanning white or the lightest background area of the copy, to control the white output signal level and the contrast or black and white amplitude ratio simultaneously.

7. In a facsimile scanning system for generating signals of different amplitudes representing different copy shadings with a predetermined maximum black-signal level and a substantially constant amplitude ratio between black and white signals irrespective of the density of the lightest tone of the copy, in combination, a source of carrier current, means including a photocell modulator connected thereto to produce a first signal varying in amplitude in accordance with the variations in light striking the photocell, means including said carrier source for generating a second signal of constant amplitude and predetermined out-of-phase relationship with respect to the first signal, means for combining said signals to produce an output signal of predetermined level when the first signal is zero or negligibly small, whereby the maximum black output signal level is fixed, and control means for varying the level of said first signal when scanning white or the lightest background of the copy to produce a white minimum output signal of desired magnitude and a substantially constant signal contrast with copy of varying tone shadings.

8. A facsimile scanning system according to claim 7 in which an exciter lamp is used to illuminate the copy and the control means for varying the level of said first signal when scanning white consists of a manually operable light-regulating valve between the exciter lamp and the photocell.

9. A facsimile scanning system according to claim 7 in which an exciter lamp is used to illuminate the copy and the control means for varying the level of said first signal when scanning white consists of a rheostat in series with the exciter lamp.

10. A facsimile scanning system according to claim 7 in which said control means to produce a white minimum signal of desired magnitude consists of means to vary the exciter lamp illumination of the copy.

11. In a photoelectric modulator for a facsimile scanner, the method of obtaining output signals having fixed contrast and fixed maximum level which comprises generating a first carrier wave of fixed amplitude independent of the excitation of the photoelectric modulator to obtain a predetermined black-signal level, combining with said first carrier wave a second carrier wave of different phase from said first carrier wave and having an amplitude dependent upon the excitation of the photoelectric modulator to obtain a resultant output carrier wave varying from minimum to maximum as the excitation of the photoelectric modulator varies from white maximum to black minimum in scanning copy, and adjusting said resultant output carrier wave to a predetermined minimum value while scanning the white or light-colored background of different copies to be transmitted, thereby obtaining the same signal contrast with copies of different background density without further adjustment.

References Cited in the file of this patent

UNITED STATES PATENTS

| | | |
|---|---|---|
| 2,186,542 | Gloess | Jan. 9, 1940 |
| 2,279,242 | O'Brien | Apr. 7, 1942 |
| 2,376,034 | Collings | May 15, 1945 |
| 2,430,095 | Asten | Nov. 4, 1947 |
| 2,459,293 | Shonnard | Jan. 18, 1949 |
| 2,488,927 | Owens | Nov. 22, 1949 |